Dec. 4, 1962 A. C. JEFFERSON 3,066,415
CELESTIAL NAVIGATION INSTRUMENT
Filed Oct. 3, 1960 3 Sheets-Sheet 1

INVENTOR.
ARCHIE C. JEFFERSON
BY
Merchant & Merchant
ATTORNEYS

Dec. 4, 1962        A. C. JEFFERSON        3,066,415

CELESTIAL NAVIGATION INSTRUMENT

Filed Oct. 3, 1960        3 Sheets-Sheet 2

INVENTOR.
ARCHIE C. JEFFERSON
BY
Merchant & Merchant
ATTORNEYS

Dec. 4, 1962 — A. C. JEFFERSON — 3,066,415
CELESTIAL NAVIGATION INSTRUMENT
Filed Oct. 3, 1960 — 3 Sheets-Sheet 3

INVENTOR.
ARCHIE C. JEFFERSON
BY
Merchant & Merchant
ATTORNEYS

United States Patent Office 3,066,415
Patented Dec. 4, 1962

3,066,415
CELESTIAL NAVIGATION INSTRUMENT
Archie C. Jefferson, 1904 S. Peninsula Drive,
Daytona Beach, Fla.
Filed Oct. 3, 1960, Ser. No. 59,863
2 Claims. (Cl. 33—1)

My invention relates to navigation instruments, and more particularly to improvements in such instruments as used in celestial navigation.

An important object of my invention is the provision of a navigation instrument which may be easily folded into substantially flat form for shipment and storage, whereby the same occupies a minimum space when not in use, and which may be quickly and easily unfolded for use.

Another object of my invention is the provision of a navigation instrument by means of which various celestial navigational factors such as longitude, azimuth, declination, hour angle, latitude and altitude may be determined when any three of these factors are known.

Another object of my invention is the provision of a navigation instrument which can be used to quickly and easily solve various navigational problems without the aid of a sextant, pelorus, compass, nautical almanac, or radio equipment, the navigator additionally requiring only a time piece such as a watch set to a given time zone, to solve most of these problems.

Another object of my invention is the provision of an instrument as set forth, which is relatively simple and inexpensive to produce, which is efficient and accurate in its operation, and which is rugged in construction and durable in use.

The above, and still further highly important objects and advantages of my invention, will become apparent from the following detailed specification, appended claims and attached drawings.

Referring to the drawings, in which like reference characters indicate like parts throughout the several views.

Figure 1:
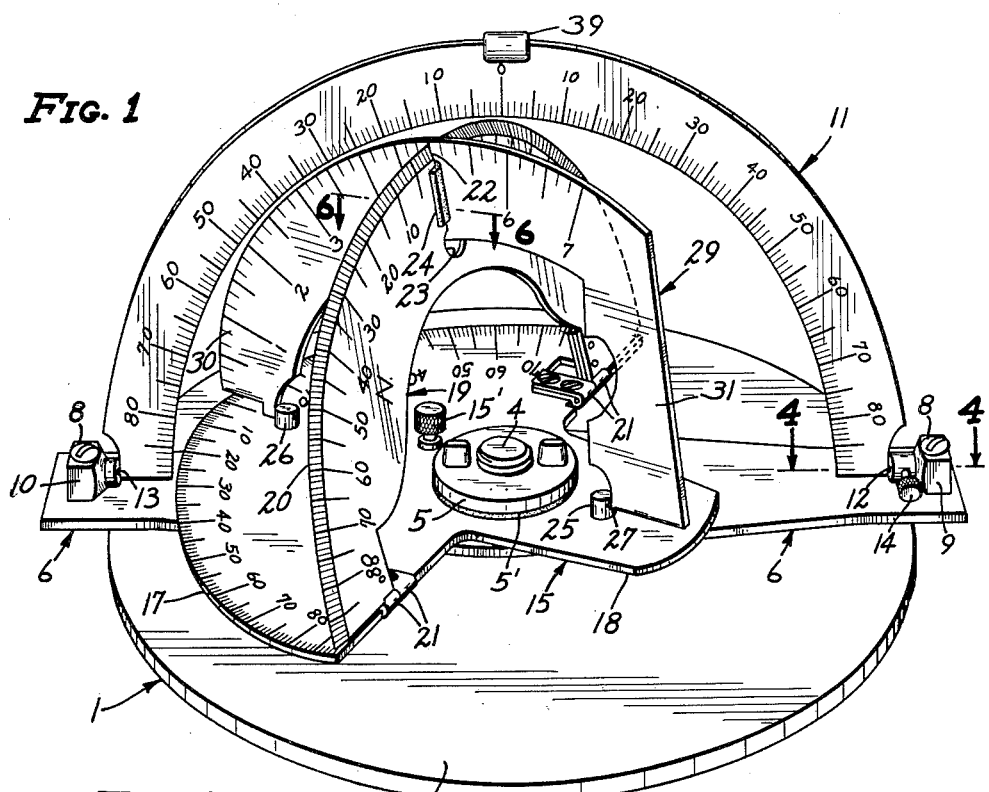
FIG. 1 is a view in perspective of a navigation instrument produced in accordance with my invention.
Figure 4:
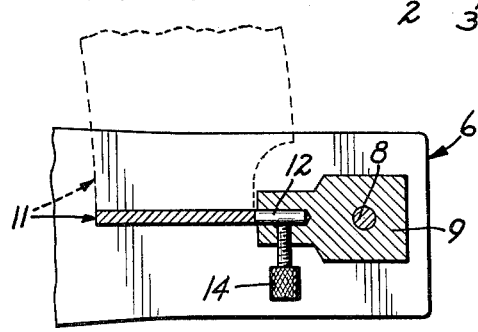
FIG. 4 is an enlarged fragmentary section taken substantially on the line 4—4 of FIG. 1.
Figure 5:
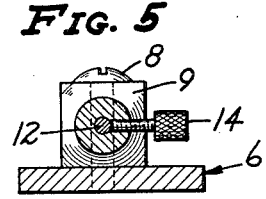
FIG. 5 is an enlarged fragmentary section taken substantially on the line 5—5 of FIG. 2.
Figure 6:
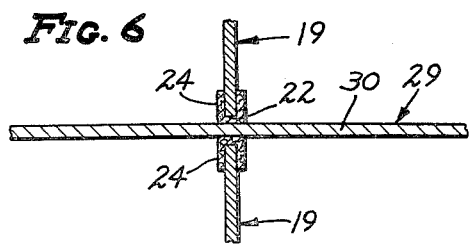
FIG. 6 is an enlarged fragmentary section taken on the line 6—6 of FIG. 1.
Figure 2:
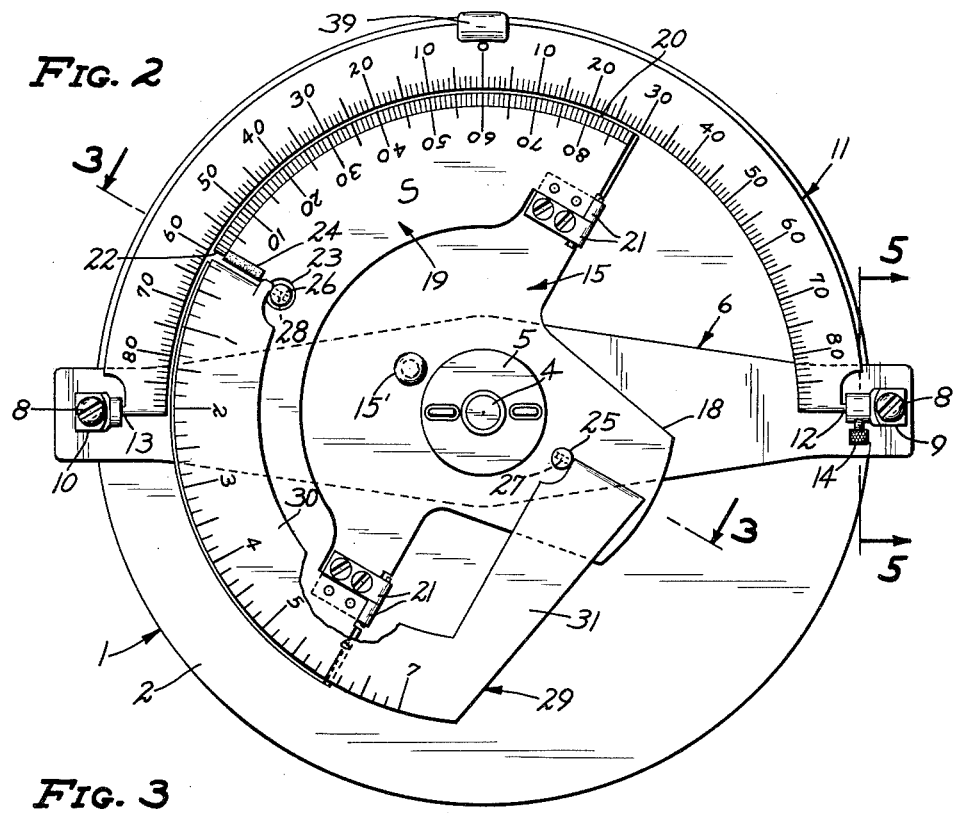
FIG. 2 is a view in top plan of the instrument of FIG. 1, but showing the same in its generally flat folded position.
Figure 3:
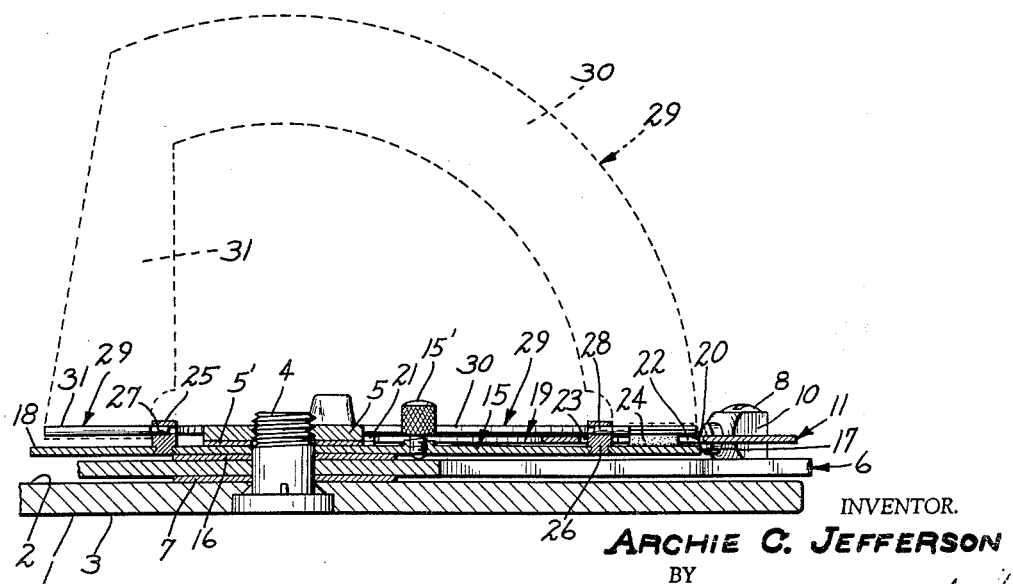
FIG. 3 is a view in section, taken on the line 3—3 of FIG. 2.
Figure 7:
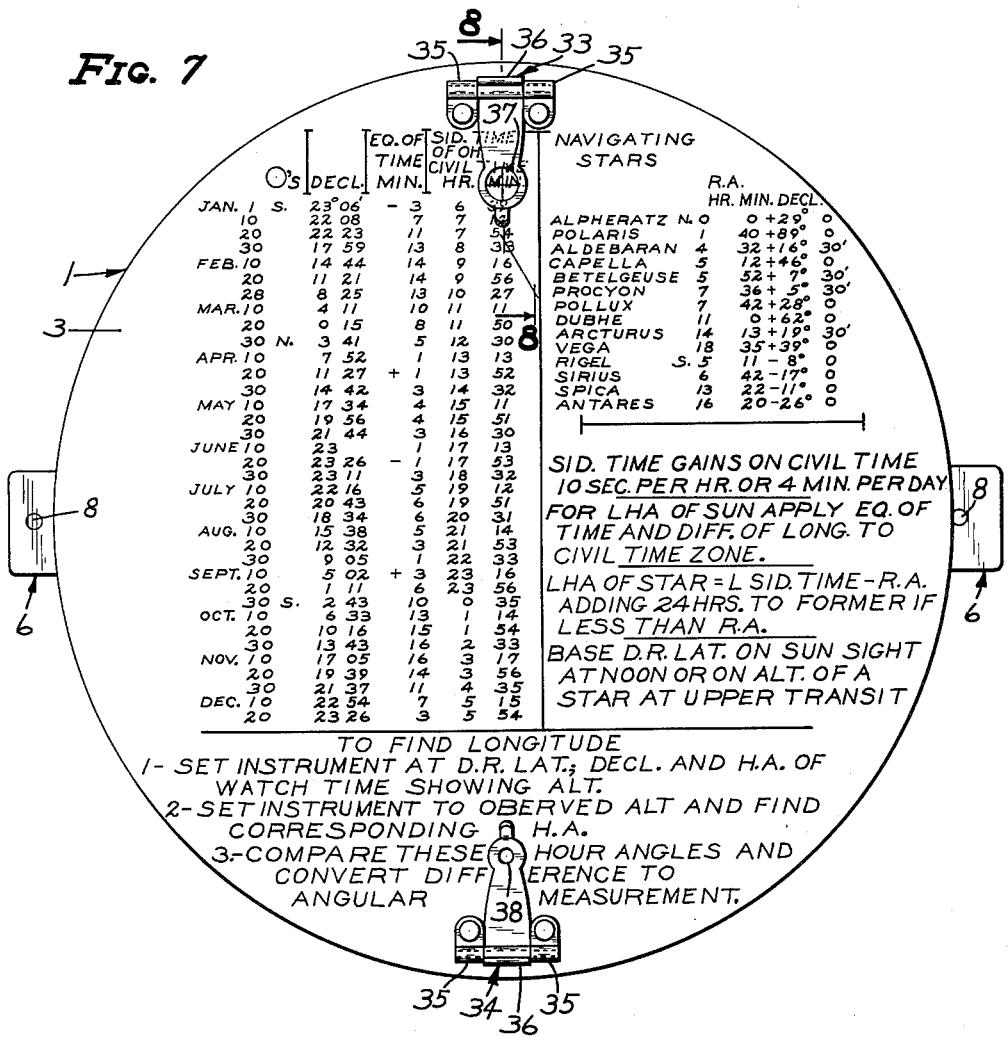
FIG. 7 is a view in bottom plan.
Figure 8:
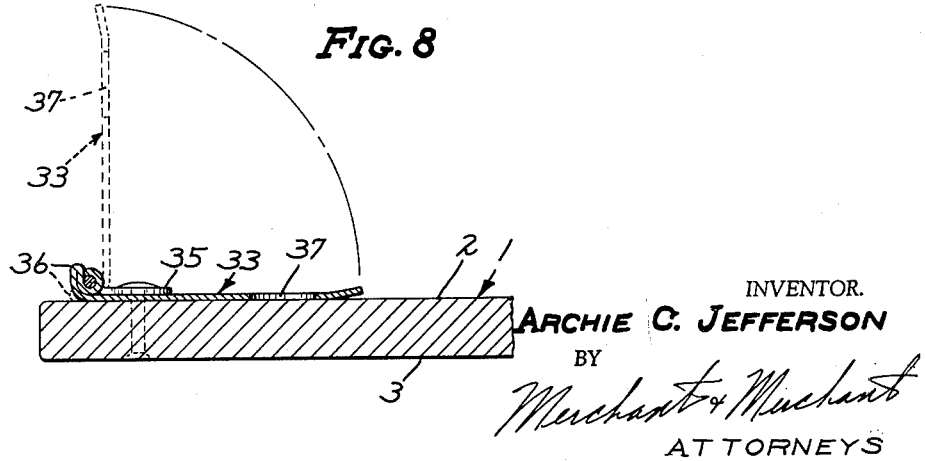
FIG. 8 is a fragmentary section taken substantially on the line 8—8 of FIG. 7.

In the preferred embodiment of my invention illustrated, the reference numeral 1 indicates a circular base member having flat top and bottom surfaces 2 and 3 respectively. A pivot shaft 4 is press fitted or otherwise rigidly mounted in the center of the base member 1 and projects axially upwardly therefrom, the upper end of the pivot shaft 4 being screw threaded to receive thereon a circular retaining nut or the like 5, the purpose of which will hereinafter become apparent. An elongated flat mounting member 6 extends diametrically across the upper surface 2 of the base member 1, and at its center is journalled on the pivot shaft 4 for rotation on the axis of the base member 1. A relatively thin washer 7, preferably made from felt or the like, supports the mounting member 6 in closely upwardly spaced relation to the top surface 2 of the base member 1, and provides sufficient frictional contact with the mounting member 6 and base member 1 to prevent free rotary movement therebetween.

Rigidly mounted, by means of screws or the like 8, at opposite ends of the mounting member 6, are opposed bearing members 9 and 10 which pivotally support a flat semi-annular measuring element 11 for swinging movements on a normally horizontal axis intersecting the axis of the pivot shaft 4 and at right angles thereto. As shown, the measuring element 11 is provided at its opposite ends with aligned trunnions 12 and 13 that are journalled in respective ones of the bearing members 9 and 10, the bearing member 9 being provided with a knurled thumb screw 14 which engages the trunnion 12, and by means of which the measuring element 11 may be releasably locked in desired set positions of its swinging movement. Preferably, the measuring element 11 is graduated on both sides adjacent its inner circumferential edge in increments of circular degrees ranging from 0 to 90 in opposite directions from the center of the arc defined by the said radially inner edge, the 90° markings being on the axis of swinging movement of the measuring element 11.

A flat generally semi-circular latitude indicator 15 is disposed in overlying spaced relation to said mounting member 6, and is journalled at its axis on the pivot shaft 4, the latitude indicator 15 being upwardly spaced from the mounting member 6 by a second washer 16 similar to the washer 7. The latitude indicator 15 defines a semi-circular edge 17 the radius of which is only slightly smaller than the radius of the radially inner edge of the measuring element 11, and a radially outwardly projecting tongue 18 diametrically opposite the central portion of the semi-circular edge 17. Adjacent the circular edge 17, the latitude indicator 15 has imprinted or otherwise marked thereon graduations indicating circular degrees from 0 to 90° in opposite directions from the center of the arc defined by the semi-circular edge 17. A third washer 5', similar to the washers 7 and 16, is interposed between the top surface of the latitude indicator 15 and the overlying retaining nut 5, the nut 5 being preferably tightened on the pivot shaft 4 to an extent wherein the mounting member 6 and the latitude indicator 15 may be easily rotated with respect to each other and to the base member 1, but wherein the mounting member and latitude indicator will be frictionally held against free rotation relative to each other and to the base member 1. A thumb screw 15' is screw threaded in the latitude indicator 15 and is adapted to engage the top surface of the underlying mounting member 6 to frictionally lock the latitude indicator 15 against rotation relative to the mounting member 6.

A flat generally semi-annular declination indicator 19 has a radially outer edge 20 which coincides with the arcuate edge 17 of the latitude indicator 15, the opposite ends of the declination indicator 19 being pivotally secured to the latitude indicator 15, by hinges or the like 21, and for swinging movements between a folded position in overlying face to face relationship with the latitude indicator 15 and an operative position angularly upwardly spaced therefrom. The axis of swinging movement of the declination indicator 19 is normally horizontal, and intersects the axis of the pivot shaft 4. Like the latitude indicator 15, the declination indicator 19 has its radially outer edge portion, preferably on both sides, provided with a graduated scale of 180 circular degrees, the scale reading from 0 to 90° circumferentially in opposite directions from the center of the arc defined by the outer edge 20 of the declination indicator 19. At its center, or at the 0 marking of the graduated scale thereon, the declination indicator 19 is formed to provide a radial slot 22 having an enlarged inner end, as indicated at 23. As shown, the opposite sides of the slot 22 are lined with compressible material, such as felt, indicated at 24.

The latitude indicator 15 is provided with a pair of upstanding bearing bosses 25 and 26, the former of which is mounted on the tongue 13, and the latter of which is positioned to extend upwardly through the enlarged inner end 23 of the slot 22 when the declination indicator 19 is in its folded position against the latitude indicator 15. The bearing bosses 25 and 26 have openings therein for reception of aligned trunnions 27 and 28 at opposite ends of an hour angle quadrant 29, the axis of the trunnions 27 and 28 being normally horizontally disposed and intersecting the axis of the pivot shaft 4. The hour angle quadrant 29 is made from flat sheet material and comprises an arcuate portion 30 and an integrally formed generally radially inwardly extending supporting leg 31 at one end of the arcuate portion 30, the trunnion 27 being disposed at the inner end of the supporting leg 31, and the trunnion 28 being disposed at the other end of the arcuate portion 30. The axis of the trunnions 27 and 28 is disposed slightly above the plane of the declination indicator 19 when the declination indicator is in its inoperative folded position against the underlying latitude indicator 15, whereby the hour angle quadrant may be pivotally swung between an inoperative folded position in overlying face to face engagement with the declination indicator 19 and a vertically disposed operative position. When the hour angle quadrant 29 is pivotally moved to its operative generally vertical position, the declination indicator 19 may be swung upwardly from its folded position, the arcuate portion 30 of the hour angle quadrant 29 being received in the slot 22 of the declination indicator 19. The felt liners 24 frictionally engage opposite sides of the hour angle quadrant 29 to frictionally hold the declination indicator 19 at any desired position of its angular movement about the aligned axes of the hinges 21. It will be noted that the radius of the outer edge of the arcuate portion 30 is substantially equal to the radii of the outer edges 17 and 20, and that opposite side faces of the hour angle quadrant 29 are provided with identical hour angle indicating scales reading from zero to seven hours, each hour of the scale equaling 15 circular degrees.

For the purpose of determining the altitude of the sun or any other given fixed star, I provide a pair of sighting elements 33 and 34 that are mounted on the bottom surface 3 of the base member 1, at diametrically opposite portions thereof, for swinging movements between inoperative folded positions against the bottom surface 3 of the base member 1 and operative positions generally normal to said bottom surface 3. As shown, the sighting elements or vanes are mounted on the base member 1 by means of hinges 35, and are preferably provided with stop elements 36 which engage the bottom surface 3 to limit swinging movements of the sighting elements 33 and 34 in one direction beyond their operative positions. The sighting elements or vanes 33 and 34 may be of any suitable construction but, for the purpose of the present example, the elements 33 and 34 are shown as being provided with respective peep holes 37 and 38 through which the selected fixed star is viewed. As shown, the bottom surface 3 provides a convenient area on which are imprinted information, directions, and tables necessary to the determination of various factors used in navigation. The sighting elements 33 and 34 are used in cooperation with the semi-annular measuring element 11 in determining the altitude of the sun or other given fixed star at the time of observation, and for this purpose, the measuring element 11 is provided with a weight 39 which, when the locking screw 14 is loosened and the device inverted so that the bottom surface 3 is uppermost, the measuring element 11 will seek a vertical position.

When it is desired to observe the altitude of a fixed star at any given time, the sighting elements 33 and 34 are moved to their operative positions normal to the bottom surface 3 of the base member 1. The mounting member 6 is rotated on the axis of the pivot shaft 4 until the axis of swinging movement of the measuring element 11 is disposed at right angles to the line of sight between the sighting elements 33 and 34. The hour angle quadrant 29 and declination indicator 19 are unfolded, the declination indicator 19 being pivotally moved upwardly until it is in register with the sixth hour on the hour angle quadrant, at which point the declination indicator 19 will be disposed at right angles to the top surface 2 of the base member 1. The latitude indicator 15 and parts carried thereby are then rotated about the axis of the pivot shaft 4 to a point wherein the plane of the declination indicator 19 is normal to the axis of swinging movement of the measuring element 11 at which point, 0° on the latitude indicator will coincide with 90° on the measuring element 11. The thumb screw 15' is tightened to lock the latitude indicator against movement, the thumb screw 14 is loosened, the instrument inverted, and the selected star is centered in the peep holes 37 and 38 of the sighting elements 33 and 34 respectively. The weight of the measuring element 11, aided by the additional weight 39 causes the measuring element 11 to assume a vertical position, and when the selected star is sighted through the sighting elements 37 and 38, the locking screw 14 is tightened to lock the measuring element 11 against swinging movement. The line of sight through the peep holes 37 and 38 being parallel with the top and bottom surfaces 2 and 3 of the base member 1, the altitude of the sighted star is read in circular degrees from the horizontal at the point where the measuring element 11 crosses the outer arcuate edge 20 of the declination indicator 19.

As an example of the various navigational problems which are quickly and easily solved by the above described instrument, the longitude of a given location may be determined as follows, it being necessary to know only the civil time zone of the location, the time of day within said time zone, and the dead reckoning latitude.

Assuming that the observer is located in an Eastern Standard time zone, that the dead reckoning latitude is 40° north, and that the time of the observation is 9:30 a.m. on the 24th of July, reference to the table on the bottom surface 3 will show that the declination of the sun is approximately 20° north. The altitude of the sun at this hour is observed, as above described, this altitude being found to be 47°. It should here be noted that the latitude and declination indicators have northern and southern halves, these being indicated at N and S respectively. The dead reckoning latitude being 40° north, the latitude indicator 15 is rotated to a point where the 40° mark on the north one-half thereof is aligned with the 90° mark at the corresponding end of the measuring element in its folded position. The time of day being 9:30 a.m., the declination indicator is swung upwardly to the hour angle scale marking 2 hours—30 minutes which represents the time differential between 9:30 a.m. and noon. The semi-annular measuring element is then swung upwardly until it crosses the 20° mark on the north side of the declination indicator, at which point the altitude on the measuring element 11 is indicated at 52°. However, the observed altitude taken through the sighting elements 33 and 34 is noted as 47°. With this in mind, the measuring element 11 and declination indicator 19 are both moved on their respective axes until the 20° north mark on the declination indicator coincides with the 47° mark on the measuring element 11. The new reading on the hour angle quadrant is noted to be 3 hours, the movement of the declination indicator relative to the hour angle quadrant being 30 minutes of hour angle measurement or 7½° of circular movement. The known longitude of the Eastern Standard time zone being 75° west, the longitude at which the observation is taken is 75° minus 7½° or 67°30 minutes west. In the interest of simplicity, the equation of time has been disregarded. However, when extreme accuracy is desired, the equation of time should be included in the calculation.

As another example of the uses of which the instrument is capable, the azimuth of a fixed object, such as the sun, may be quickly and easily determined when the latitude, declination and hour angle are known. The axis of swinging movement of the measuring element 11 is aligned with the dead reckoning latitude indicated on the latitude indicator 15 and the declination indicator is set to the known hour angle on the hour angle quadrant 29. The measuring element 11 is swung upwardly to where it crosses the designated declination on the declination indicator 19 at which point the altitude of the sun is indicated on the measuring element 11. Having previously observed the altitude of the sun, as hereinbefore described, the measuring element 11 and the declination indicator 19 are swung about their respective axes until the designated declination on the declination indicator 19 coincides with the observed altitude of the sun as indicated on the measuring element 11. The thumb screw 14 is then tightened to lock the measuring element 11 in place. Up to this point, the procedure is exactly that followed in determining longitude, as hereinbefore described. Then, with the measuring element 11 locked in position, the mounting member 6 is rotated relative to the latitude indicator 15 until the axis of swinging movement of the measuring element 11 is aligned with the zero marking on the latitude indicator 15 and the declination indicator 19 is pivotally moved to a position normal to the plane of the latitude indicator 15, in which position the declination indicator coincides with the numeral six on the hour angle scale. The measure of azimuth is then read on the declination indicator 15 at the intersection thereof with the measuring element 11, the azimuth being measured from the plane of the latitude indicator 15, or 90° plus or minus the angle indicated on the declination scale. If desired, the declination indicator 19 may be provided with additional scales on opposite sides thereof, reading from zero to 180°, which scales would give the azimuth reading directly, thus eliminating the necessity for adding to, or subtracting from, a ninety degree figure as above indicated.

The above described operations of my improved navigation instrument are accomplished in but a few moments of time, and the instrument may be used to solve various problems in navigation with but a limited amount of knowledge on the subject. Not only can the above mentioned factors be quickly and easily determined with the use of my instrument but other navigational problems may be quickly and easily solved, such as finding a line of position by the Marque Saint Hilaire method, dispensing with the use of tables and formulae, and in finding the great circle course between two points and the distance therebetween. Further, the instant device is helpful in the study of navigation, enabling the student to visualize the great circle arcs pertaining to the celestial sphere. I have found that, by using my improved instrument and an accurate time piece such as a good watch, I have been enabled to quickly and easily solve various navigational problems when conventional navigating instruments and equipment are not available.

My invention has been thoroughly tested and found to be completely satisfactory for the accomplishment of the objectives set forth; and, while I have shown and described a commercial embodiment of my improved navigating instrument, it will be understood that the same is capable of modification without departure from the spirit and scope of the invention, as defined in the claims.

What I claim is:

1. In a navigation instrument, a normally horizontally disposed mounting plate, pivot means having a normally vertical axis at the central portion of said mounting plate, a graduated semi-annular measuring element pivotally secured at its opposite ends to the mounting plate on a normally horizontal axis intersecting the axis of said pivot means for movements from a generally horizontal position in closely spaced overlying relation to said mounting plate to positions angularly upwardly spaced therefrom, a flat graduated latitude indicator overlying said mounting plate and pivotally secured thereto by said pivot means, a flat graduated declination indicator pivotally mounted on said latitude indicator on a normally horizontal axis intersecting the axis of said pivot means for upward swinging movements from an inoperative position in overlying face-to-face relation to said latitude indicator to operative positions angularly spaced therefrom, said indicators having arcuate outer edges, and a graduated hour angle quadrant pivotally mounted on said latitude indicator on a normally horizontal axis intersecting the axis of said pivot means and normal to the axis of swinging movement of said declination indicator and for swinging movement between a horizontal inoperative position in overlying face-to-face relation to a portion of said declination indicator and an operative vertical position, said declination indicator having an opening for reception of said hour angle quadrant when said quadrant is moved to its operative vertical position, the radii of the outer edges of said latitude and declination indicators and said quadrant being substantially equal, said radii being slightly less than the radius of the inner edge of said measuring element.

2. The structure defined in claim 1 in which the axis of swinging movement of said hour angle quadrant and one end of said quadrant are disposed above the plane of the top surface of said latitude indicator a distance at least equal to the thickness of said declination indicator, said one end of the quadrant being displaced from said opening in the declination indicator when said declination indicator is in its horizontal inoperative position, whereby said quadrant may be moved to its horizontal inoperative position.

References Cited in the file of this patent

UNITED STATES PATENTS

| | | |
|---|---|---|
| 842,584 | Ridley | Jan. 29, 1907 |
| 1,512,856 | Nuschak | Oct. 21, 1924 |
| 1,547,940 | Monney | July 28, 1925 |
| 2,482,749 | Eckert | Sept. 27, 1949 |